United States Patent
Baird et al.

(10) Patent No.: US 11,846,319 B2
(45) Date of Patent: Dec. 19, 2023

(54) IMPACT SHIELD FOR SHAFT ASSEMBLY

(71) Applicant: GOODRICH CORPORATION, Charlotte, NC (US)

(72) Inventors: Bradley William Baird, Grimsby (CA); James William Bernard, Brackley (GB)

(73) Assignee: GOODRICH CORPORATION, Charlotte, NC (US)

(*) Notice: Subject to any disclaimer, the term of this patent is extended or adjusted under 35 U.S.C. 154(b) by 456 days.

(21) Appl. No.: 16/950,048

(22) Filed: Nov. 17, 2020

(65) Prior Publication Data
US 2022/0082125 A1  Mar. 17, 2022

(30) Foreign Application Priority Data

Sep. 14, 2020 (GB) ...................... 2014395

(51) Int. Cl.
*F16C 3/02* (2006.01)

(52) U.S. Cl.
CPC .......... *F16C 3/026* (2013.01); *F16C 2208/02* (2013.01); *F16C 2208/04* (2013.01); *F16C 2208/10* (2013.01); *F16C 2208/20* (2013.01)

(58) Field of Classification Search
CPC .. F16C 3/026; F16C 2208/02; F16C 2208/04; F16C 2208/10; F16C 2208/20
USPC ................................ 464/181, 182
See application file for complete search history.

(56) References Cited

U.S. PATENT DOCUMENTS

| | | | |
|---|---|---|---|
| 4,185,472 A | * | 1/1980 | Yates ............... B29C 70/86 464/181 |
| 8,808,488 B2 | | 8/2014 | Nogues et al. |
| 9,638,241 B2 | | 5/2017 | Gallant et al. |
| 2018/0283458 A1 | | 10/2018 | Bernard et al. |
| 2020/0224711 A1 | | 7/2020 | Reed et al. |

FOREIGN PATENT DOCUMENTS

| | | |
|---|---|---|
| EP | 3587889 | 1/2020 |
| EP | 3617064 | 3/2020 |
| FR | 2984795 | 6/2013 |
| GB | 2406154 | 3/2005 |
| WO | 2016180901 | 11/2016 |

OTHER PUBLICATIONS

European Patent Office; European Search Report dated Jan. 20, 2022 in Application No. 21196534.8.

* cited by examiner

*Primary Examiner* — Greg Binda
(74) *Attorney, Agent, or Firm* — SNELL & WILMER L.L.P.

(57) ABSTRACT

A shaft assembly includes a composite tube and an impact shield. The composite tube has a longitudinal centerline axis and the impact shield may be disposed around the composite tube and may extend along a length of the composite tube. A gap may be defined between the composite tube and the impact shield. Generally, shaft assembly is configured to inhibit impact damage to the composite tube and/or facilitate visual detection of damage from impacts. The shaft assembly may further include a shock absorbing sleeve disposed in the gap between the composite tube and the impact shield.

13 Claims, 3 Drawing Sheets

IMPACT SHIELD FOR SHAFT ASSEMBLY

CROSS-REFERENCE TO RELATED APPLICATIONS

This application claims priority to and the benefit of United Kingdom Patent Application No. 2014395.4 filed 14 Sep. 2020 and entitled "IMPACT SHIELD FOR SHAFT ASSEMBLY," which is incorporated herein by reference in its entirety for all purposes.

FIELD

The present disclosure relates generally to impact shielding for composite shafts, and more specifically to shaft assemblies that have an impact shield.

BACKGROUND

Many aircraft components, such as those found in landing gear assemblies, are conventionally made from metallic materials, which are heavy and add weight to an aircraft. Substitution of metals by fiber-reinforced polymer-matrix composites (PMC) is one way to reduce weight of landing gear assemblies and/or aircraft actuators. However, although PMCs may have various weight-saving benefits, conventional PMCs may be more prone to impact damage, such as damage from bird strikes, liberated pieces of tire tread, and/or other debris. Conventional solutions to this impact damage problem generally include increasing the thickness of the composite component. However, not only does this solution lessen the weight-saving benefit of the composite, but some thick-walled composite structures that experience an impact event may not produce a visual/surface indication of said impact, despite the fact that the impact may have resulted in hidden/internal damage. This can lead to structural damage going unnoticed.

SUMMARY

In various embodiments, the present disclosure provides a shaft assembly that includes a composite tube and an impact shield. The composite tube may include a longitudinal centerline axis and the impact shield may be disposed around the composite tube and may extend along a length of the composite tube. A gap may be defined between the composite tube and the impact shield.

In various embodiments, the impact shield and the composite tube are concentric about the longitudinal centerline axis. The shaft assembly may further include a fitting coupled to one end of the composite tube. The fitting may be an annular fitting, and the annular fitting may be coupled to a radially outward surface of the composite tube. The impact shield may be mounted to the annular fitting such that the impact shield is coupled to the composite tube via the annular fitting. Said differently, the impact shield may be exclusively coupled to the composite tube via the annular fitting. For example, the impact shield may not be directly coupled to the composite tube. In various embodiments, the annular fitting comprises a shoulder, wherein an end of the impact shield is mounted to the annular fitting at the shoulder. In various embodiments, respective radially outward surfaces of the annular fitting and the impact shield are substantially flush at their adjoining interface.

According to various embodiments, the composite tube includes a carbon fiber reinforced polymer material. The impact shield may also be made from a carbon fiber reinforced polymer material. The composite tube may be specifically designed and optimized for load bearing and the impact shield may be designed and optimized for impact shield and visual damage detection/inspection.

The shaft assembly may further include a shock absorbing sleeve disposed in the gap between the composite tube and the impact shield. In various embodiments, the impact shield, the shock absorbing sleeve, and the composite tube are concentric about the longitudinal centerline axis. In various embodiments, the shock absorbing sleeve comprises an unreinforced fiber material. For example, the shock absorbing sleeve may comprise at least one of a braided aramid material, a glass fiber material, a thermoplastic fiber material, a viscoelastic polymer material, an elastomeric polymer material, and a foam material. In various embodiments, the impact shield comprises a higher stiffness rating than the shock absorbing sleeve. In various embodiments, the shock absorbing sleeve has a higher modulus of toughness rating than the impact shield.

Also disclosed herein, according to various embodiments, is a shaft assembly that includes a composite tube, a first annular fitting, a second annular fitting, an impact shield, and a shock absorbing sleeve. The composite tube may include a first end portion, a second end portion, and a longitudinal centerline axis. The first annular fitting may be coupled to a radially outward surface of the composite tube at the first end portion of the composite tube. The second annular fitting may be coupled to the radially outward surface of the composite tube at the second end portion of the composite tube. The impact shield may be coupled to and extending between the first annular fitting and the second annular fitting, wherein a gap is defined between the composite tube and the impact shield. The shock absorbing sleeve may be disposed in the gap. According to various embodiments, a first end of the impact shield is received by a shoulder of the first annular fitting and a second end of the impact shield at least partially overlaps a radially outward surface of the second annular fitting, wherein the shaft assembly further comprises a removable retaining ring disposed around the second annular fitting for detachably securing the impact shield.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1B:
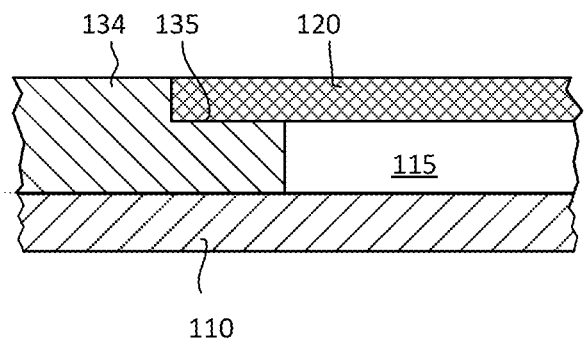
FIG. 1B is a magnified cross-sectional view of a region of the shaft assembly shown in FIG. 1A, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. Throughout the present disclosure, like reference numbers denote like elements.

The present disclosure describes composite tubes and shaft assemblies. In various embodiments, the present disclosure relates to shielding composite tubes and other composite structures from impact damage and/or assemblies that enable visual detection of impact damage. Such shaft assemblies may be used in aircraft systems, such as landing gear systems. However, the apparatuses, assemblies, and systems disclosed herein are not limited to aircraft components and thus the details of the present disclosure may be suitable for non-aircraft implementations.

As mentioned above, substitution of metals by fiber-reinforced polymer-matrix composites (PMC) is one way to reduce weight of landing gears or aircraft actuators. The shaft assembly disclosed herein, according to various embodiments, provides a configuration that inhibits impact damage to the composite structure(s) and/or that facilitates visual detection of damage from impacts (thus helping ensure damage does not go undetected). As used herein, the term "axial" refers to a position or direction along a longitudinal centerline axis of a composite tube. For example, a first feature that is "axially inward" of a second feature is closer to the axial center of the assembly than the second feature. Also, the term "radial" refers to a position or direction away from the longitudinal centerline axis of the composite tube. For example, a first component that is "radially inward" of a second component means that the first component is positioned closer to the longitudinal centerline axis of the composite tube than the second component.

Figure 1A:
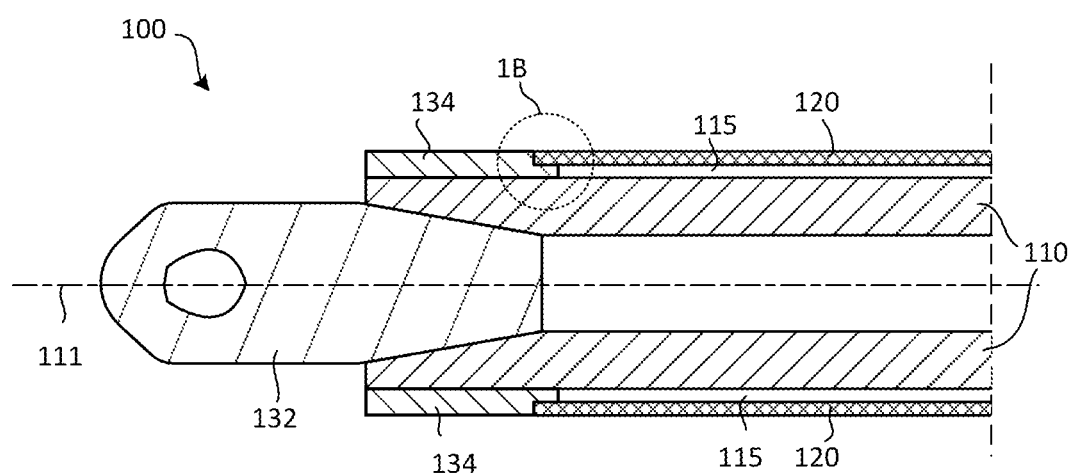
FIG. 1A is a cross-sectional view of a shaft assembly having an impact shield, in accordance with various embodiments.

With reference to FIGS. 1A and 1B, a shaft assembly 100 is provided having a composite tube 110 and an impact shield 120. FIG. 1B is an enlarged view of the area of FIG. 1A labeled with "1B." The composite tube 110 has a longitudinal centerline axis 111 and the impact shield 120 is generally disposed around the composite tube 110 and extends along a length of the composite tube 110, according to various embodiments. In various embodiments, a gap 115 is defined between the composite tube 110 and the impact shield 120. The impact shield 120 and the composite tube 110 may be concentric about the longitudinal centerline axis 111, and thus the gap 115 may be an annular gap. As described in greater detail below with reference to FIGS. 2A and 2B, in various embodiments a shock absorbing sleeve 215 may be disposed in the gap 115. In various embodiments, and also as described in greater detail below, the shaft assembly 100 may further include one or more fittings 132, 134 coupled to one or both ends of the composite tube 110. The fittings 132, 134 may be utilized to couple the shaft assembly 100 to adjoining component(s).

In various embodiments, the shaft assembly 100 is specifically configured with the gap 115 between the impact shield 120 and the composite tube 110 so as to provide various benefits. For example, the impact shield 120 may serve as a sacrificial debris shield to prevent damage to the load-bearing composite tube 110 and/or the impact shield 120 may function as a visual indicator of damage. In various embodiments, the impact shield 120 may prevent (or at least mitigate) certain thresholds of impact force from damaging the composite tube 110. For example, if an operator were to drop objects/tools onto the shaft assembly 100 during maintenance or repair, the impact shield 120 may prevent the impact force from reaching the composite tube 110 (due to the gap 115), thus preserving the structural integrity of the load-bearing composite tube 110. In various embodiments, inspection of the composite tube 110 may only be warranted if the impact shield 120 has been punctured or sufficiently fractured, or if the impact shield has deformed inwards to close the distance of the gap 115. In various embodiments, the impact shield 120 may be removed to allow inspection of the underlying composite tube 110, and after inspection/repair of the composite tube 110, a new impact shield 120 may be installed. Additional details pertaining to this inspection/replacement method are included below with reference to FIG. 3.

In various embodiments, the impact shield 120 may be specifically configured to provide visual inspection benefits. The Federal Aviation Administration ("FAA"), with reference to FAA AC 20-107B, defines various categories of damage (e.g., categories 1-4), with category 1 referring to minimal damages, such as surface scratches, handling damage, etc. For example, barely visible impact damage ("BVID") is a type of category 1 damage that refers to damage to a composite material caused by low force impacts, such as those described above pertaining to a tool drop during maintenance, that is at least "barely visible." Said differently, if a tool is known to have been dropped onto a conventional composite material (without the impact shield 120) but no damage is visible, an approved non-destructive inspection may need to be performed to determine the presence/extent of damage that was done to the composite structure. However, the if the impact shield 120 had been utilized in this scenario, the impact shield 120 may be designed to have a sufficiently low BVID threshold such that the low impact force results in visible damage to the impact shield 120, thereby allowing the operator to visibly confirm the extent of damage without having to complete a non-destructive inspection. Said differently, in the shaft assembly 100 of the present disclosure the load-bearing and weight saving properties of the composite tube 110 may be optimized while the impact shield 120 may be designed for BVID considerations.

If the impacting body exceeds the category 1 threshold (e.g., the BVID energy threshold), the impact shield can be designed to fully absorb the impact or partially absorb the energy of impact, according to various embodiments. Again, with reference to FAA AC 20-107B, BVID falls under Category 1 damage and thus the impact shield may be designed to fully absorb this energy. For category 2 through 4 damage, the impact shield may be designed to fully absorb or partially absorb the damage. If the shield fully absorbs the damage, then the main composite tube will not be required to be sized/certified for Category 2 through 4 damages, thus saving weight and development costs. If the shield partially absorbs the impact, scenarios could exist where:

Category 4 event will only produce a Cat 1, 2, or 3 damage on the main tube.

Category 3 event will only produce a Cat 1 or 2 damage on the main tube.

Category 2 event will produce a Cat 1 or lower damage on the main tube.

In these scenarios above, the certification standard will be lower on the composite tube, thus reducing the weight and development cost of the design. Weight trade studies, customer input, and regulatory input may all contribute in determining to what extent the impact shield should be designed to absorb different categories of impact energy.

In various embodiments, the composite tube 110 and the impact shield 120 may both be made from composite materials (e.g., carbon fiber reinforced polymer material), but may be optimized, both in terms of composition and wall thickness, for their respective intended purpose. That is, the composite tube 110 may be designed for high load transfer and the impact shield may be designed for impact shielding and/or BVID considerations. In various embodiments, the composite tube 110 and/or the impact shield comprise a fiber reinforced polymer material. In various embodiments, the composite tube 110 and/or the impact shield 120 may be formed of a thermoset or a thermoplastic material. In various embodiments, initially forming the composite materials may be performed using various manufacturing methods. For example, the manufacturing method may include laying up a fiber matrix material (e.g., fiber matt, fibers, prepreg, etc.) around/over a removable mandrel. The fiber matrix material may be applied over the mandrel using winding or wrapping techniques, such as a filament-winding technique or an automatic filament placement technique, among others. In various embodiments, the method may include additively manufacturing steps.

The manufacturing method for the composite tube 110 and/or the impact shield may include impregnating the fiber matrix material with an uncured polymer thermoset resin, a molten thermoplastic polymer, or a thermoplastic polymer in solution. This resin impregnation step may be repeated with additional layers of fiber or fiber-matrix material. With thermoplastic materials, the method may include heating the polymer matrix composite to consolidate, shape, and anneal the thermoplastic composite tube. Examples of thermoset polymer resins used in the various embodiments include, but not limited to, epoxy, polyimide, bis-maleimide, polyurethane, and blends or combinations thereof. Examples of thermoplastic polymers used in the various embodiments include, but are not limited to, polyetheretherketone, polyetherimide, polysulfone, polyphenylsulfone, polyphenylene sulfide, and blends or combinations thereof. Examples of fibers used in the various embodiments include, but not limited to, carbon fibers, aramid fibers, glass fibers, and combinations thereof.

In various embodiments, and with continued reference to FIGS. 1A and 1B, the fitting(s) of the shaft assembly 100 include a central fitting 132 and/or an annular fitting 134. In various embodiments, the fittings 132, 134 may comprise a metallic material, and thus the shaft assembly 100 may be referred to as a hybrid joint assembly (including composite materials and metallic materials to effectuate load transfer at the end of the composite tube). In various embodiments, the central fitting 132 may engage a radially inward surface of the composite tube 110 and the annular fitting 134 may engage a radially outward surface of the composite tube 110. In various embodiments, engagement between the fittings 132, 134 and the end portion of the composite tube 110 is direct contact (e.g., threaded, bonded contact, or non-bonded contact). The direct contact may be enhanced by compressing the end portion of the composite tube 110 between the central fitting 132 and the annular fitting 134. For example, the internal/central fitting 132 may be inserted into one (or both) open ends of the composite tube 110 (the ends may be tapered), and the annular fitting 134 may be positioned around the external surface of the composite tube 110. The end portion of the composite tube 110 may be shaped (e.g., tapered) via the clamping force between the central fitting 132 and the annular fitting 134. In response to the end portion of the composite tube being clamped between the two fittings 132, 134, the composite tube 110 may be cured. In various embodiments, the term "curing" may refer to curing thermoset materials or solidifying thermoplastic materials.

As mentioned above, the fittings 132, 134 may be made from a metallic material. The fittings 132, 134 may be held against (e.g., engaged with) the end portion of the composite tube 110 by applying mechanical force, for example by threaded translation of the central fitting 132 with respect to the annular fitting 134, or vice versa. In various embodiments, the process of curing the composite tube 110 bonds the fittings 132, 134 to the composite tube 110. In various embodiments, adhesives, resins, or bonding agents may be utilized to bond the fittings 132, 134 to the composite tube 110.

In various embodiments, the impact shield 120 may be mounted to the annular fitting 134 (e.g., coupled to a radially outward surface of the annular fitting 134) such that the impact shield 120 is coupled to the composite tube 110 via the annular fitting 134. For example, the impact shield 120 may exclusively be coupled to the composite tube 110 via the annular fitting 134. Said differently, the impact shield 120 may only be indirectly coupled to the composite tube 110 (and thus may not be directly coupled to composite tube 110). Therefore, the metallic material of the annular fitting 134 may function as a force propagation buffer between the impact shield 120 and the composite tube 110. In various embodiments, the annular fitting 134 includes/defines a shoulder 135, and an end of the impact shield 120 may be received by the shoulder 135 to facilitate the coupling between the impact shield 120 and the annular fitting 134. In various embodiments, respective radially outward surfaces of the annular fitting 134 and the impact shield 120 are substantially flush at their adjoining interface. In various embodiments, a retaining ring may be disposed at the opposing end of the impact shield (see, for example, component 337 mentioned below with reference to FIG. 3), and the impact shield 120 may be retained between the shoulder 135 and the retaining ring. Such a configuration may allow for the impact shield 120 to be easily removed for inspection and/or replaced.

Figure 2B:
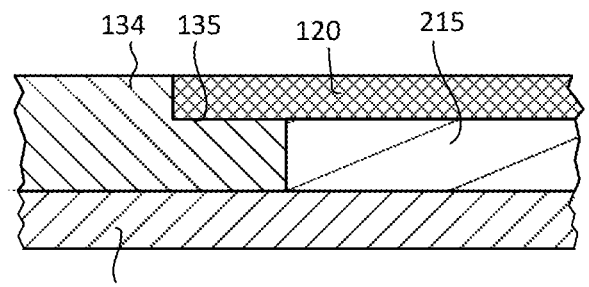
FIG. 2B is a magnified cross-sectional view of a region of the shaft assembly shown in FIG. 2A, in accordance with various embodiments.
Figure 2A:
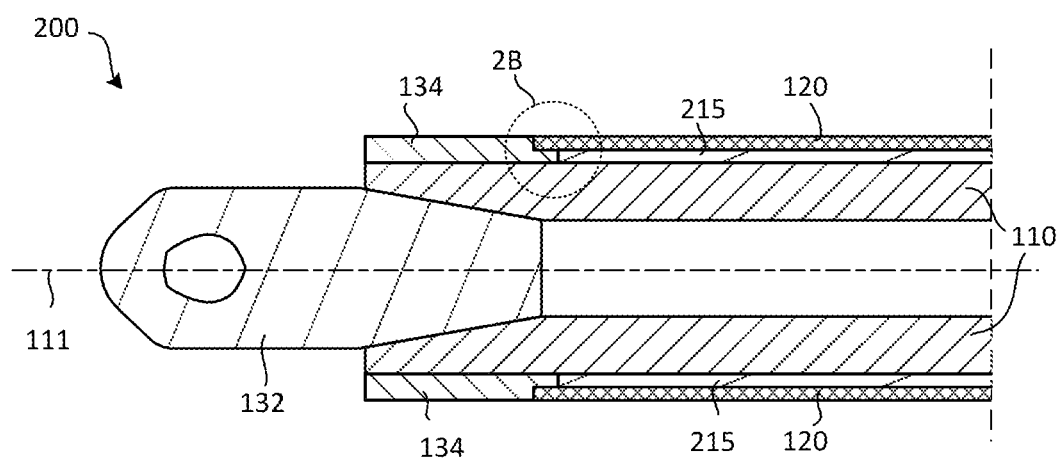
FIG. 2A is a cross-sectional view of a shaft assembly having an impact shield and a shock absorbing sleeve, in accordance with various embodiments.

In various embodiments, and with reference to FIGS. 2A and 2B, the shaft assembly 200 includes a shock absorbing sleeve 215 disposed in the gap between the impact shield 120 and the composite tube 110. FIG. 2B is an enlarged view of the area of FIG. 2A labeled with "2B." The impact shield 120, the shock absorbing sleeve 215, and the composite tube 110 may be concentric about the longitudinal centerline axis 111. The shock absorbing sleeve 215 may be generally configured to absorb and/or dissipate impact force, thus preventing damage to the load-bearing composite tube 110.

In various embodiments, the shock absorbing sleeve 215 may not be positively affixed/coupled to the composite tube 110 or the impact shield 120, and thus the shock absorbing sleeve 215 may be housed, captured, enclosed, or otherwise mechanically secured within the gap 115 (FIGS. 1A and 1B). In the event of a tool drop onto or debris contact with the impact shield 120, the impact shield 120 may fracture and the impact force may be dissipated/absorbed via the contained shock absorbing sleeve 215. In various embodiments, the shock absorbing sleeve 215 is made from an unreinforced material, such as an unreinforced fiber material. For example, the shock absorbing sleeve 215 may be made from at least one of a braided aramid material (e.g., a braided bi-axial structure), a glass fiber material, a thermoplastic fiber material, a viscoelastic polymer material, an elastomeric polymer material, and a foam material (including non-metallic and/or metallic materials, such as an aluminum foam material).

In various embodiments, the shock absorbing sleeve 215 may be specifically configured and designed to have a high modulus of strength/toughness. Therefore, when the shock absorbing sleeve 215 is subjected to the force from an impact event, the shock absorbing sleeve 215 facilitates wave propagation which, in turn, results in more of the unreinforced fibers being subjected to strain, thereby resulting in higher impact energy absorption (e.g., impact energy is spread over a larger surface area). Thus, the impact shield 120 may have a higher stiffness rating than the shock absorbing sleeve 215 but the shock absorbing sleeve 215 may have a higher modulus of toughness rating than the impact shield 120. In various embodiments, after an impact event the shock absorbing sleeve 215 may be replaced.

Figure 3:
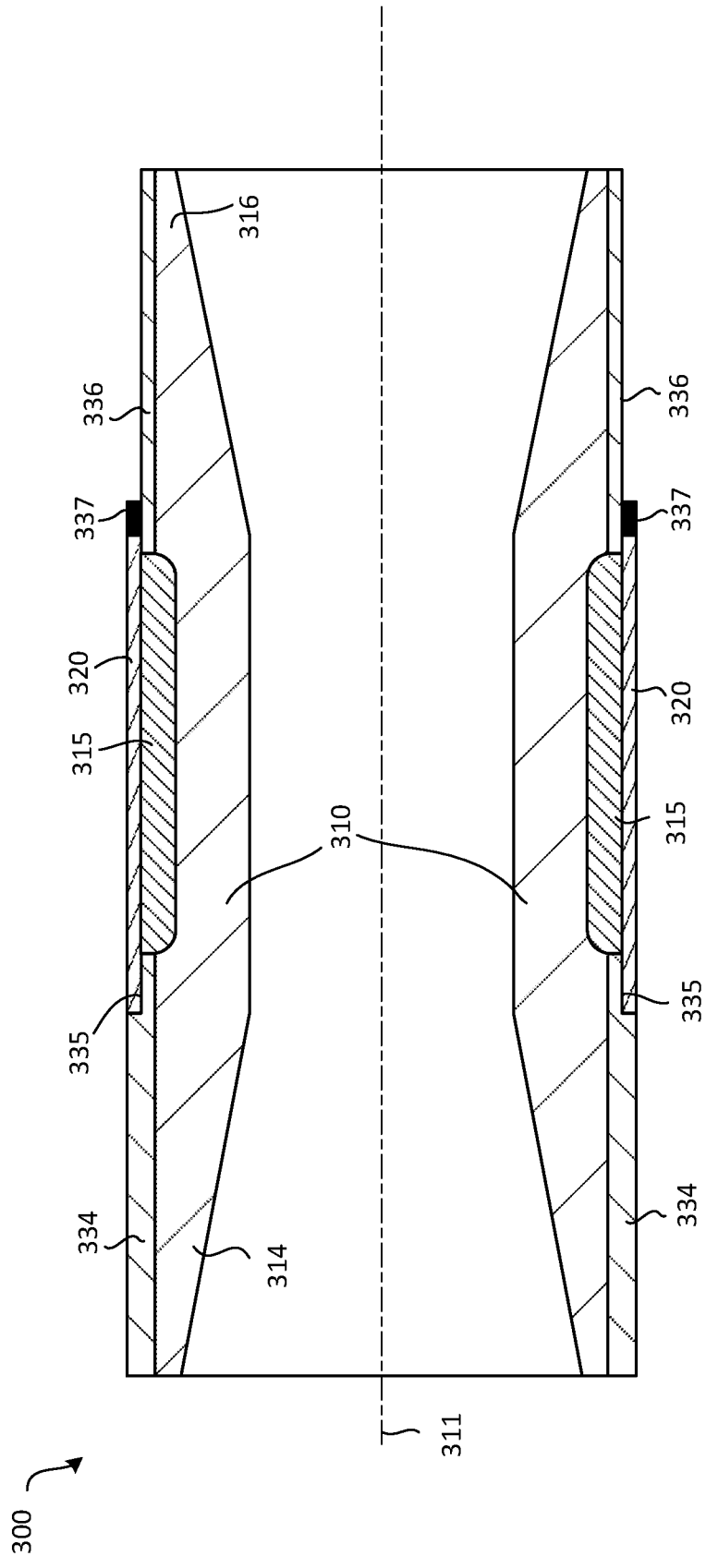
FIG. 3 is a cross-sectional view of a shaft assembly having two annular fittings disposed at opposing ends of a composite tube with an impact shield and a shock absorbing sleeve generally disposed between the two annular fittings, in accordance with various embodiments.

In various embodiments, and with reference to FIG. 3, the shaft assembly 300 includes a composite tube 310, a first annular fitting 334, a second annular fitting 336, an impact shield 320, and a shock absorbing sleeve 315. The composite tube 310 may include a first end portion 314, a second end portion 316, and a longitudinal centerline axis 311. The first annular fitting 334 may be coupled to a radially outward surface of the composite tube 310 at the first end portion 314 of the composite tube 310. Similarly, the second annular fitting 336 may be coupled to the radially outward surface of the composite tube 310 at the second end portion 316 of the composite tube 310. The impact shield 320 may be coupled to and may extend between the first annular fitting 334 and the second annular fitting 336. A gap may be defined between the composite tube 310 and the impact shield 320, and the shock absorbing sleeve 315 may be disposed within this gap. In various embodiments, this gap/pocket within which the shock absorbing sleeve 315 is disposed is further defined, at least partially, by axially inward ends of the two annular fittings 334, 336.

In various embodiments, the entire radially outward surface of the composite tube 310 along its length is covered by an annular fitting 334, 336 or an impact shield 320, thus preventing debris or other objects from directly contacting the load bearing composite tube 310. In various embodiments, the first annular fitting 334 may include a region that has a radial wall thickness that is greater than the wall thickness of the second annular fitting 336. For example, the first annular fitting 334 may include a shoulder 335 and a first end of the impact shield 320 may be received by the shoulder 335 with a second end of the impact shield 320 at least partially overlapping the radially outward surface of the second annular fitting 336. In such a configuration, the shaft assembly 300 may further include a removable retaining ring 337 disposed around the second annular fitting 336 for detachably securing the impact shield 320. That is, the impact shield 320 may be removably secured in place around the shock absorbing sleeve 315 by axial retention between the shoulder 335 and the retaining ring 337.

In various embodiments, the radial wall thickness of the composite tube is greater than the radial wall thickness of the shock absorbing sleeve and greater than the radial wall thickness of the impact shield. In various embodiments, the radial wall thickness of the shock absorbing sleeve is greater than the radial wall thickness of the impact shield. In various embodiments, the radial wall thickness of the impact shield is less than 50% of the radial wall thickness of the composite tube. In various embodiments, the radial wall thickness of the impact shield is between 10% and 50% of the radial wall thickness of the composite tube.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shaft assembly comprising:
   a composite tube comprising a longitudinal centerline axis;
   a central fitting coupled to a radially inward surface of one end of the composite tube;
   an annular fitting coupled to a radially outward surface of the one end of the composite tube, wherein the end of the composite tube is shaped via a clamping force between the central fitting and the annular fitting; and
   an impact shield disposed around the composite tube and extending along a length of the composite tube;
   wherein a gap is defined between the composite tube and the impact shield,
   wherein the impact shield is mounted to the annular fitting such that the impact shield is coupled to the composite tube via the annular fitting, and
   wherein the impact shield is exclusively coupled to the composite tube via the annular fitting.

2. The shaft assembly of claim 1, wherein the impact shield and the composite tube are concentric about the longitudinal centerline axis.

3. The shaft assembly of claim 1, wherein the impact shield is not directly coupled to the composite tube.

4. The shaft assembly of claim 1, wherein the annular fitting comprises a shoulder, wherein an end of the impact shield is mounted to the annular fitting at the shoulder.

5. The shaft assembly of claim 4, wherein respective radially outward surfaces of the annular fitting and the impact shield are substantially flush at their adjoining interface.

6. The shaft assembly of claim 1, wherein the composite tube comprises a carbon fiber reinforced polymer material.

7. The shaft assembly of claim 1, wherein the impact shield comprises a carbon fiber reinforced polymer material.

8. A shaft assembly comprising:
   a composite tube comprising a longitudinal centerline axis;
   a central fitting coupled to a radially inward surface of one end of the composite tube;
   an annular fitting coupled to a radially outward surface of the one end of the composite tube, wherein the end of the composite tube is shaped via a clamping force between the central fitting and the annular fitting;
   an impact shield disposed around the composite tube and extending along a length of the composite tube, wherein a gap is defined between the composite tube and the impact shield; and
   a shock absorbing sleeve disposed in the gap,
   wherein the impact shield is mounted to the annular fitting such that the impact shield is coupled to the composite tube via the annular fitting, and
   wherein the impact shield is exclusively coupled to the composite tube via the annular fitting.

9. The shaft assembly of claim 8, wherein the impact shield, the shock absorbing sleeve, and the composite tube are concentric about the longitudinal centerline axis.

10. The shaft assembly of claim 8, wherein the shock absorbing sleeve comprises an unreinforced fiber material.

11. The shaft assembly of claim 8, wherein the shock absorbing sleeve comprises at least one of a braided aramid material, a glass fiber material, a thermoplastic fiber material, a viscoelastic polymer material, an elastomeric polymer material, and a foam material.

12. The shaft assembly of claim 8, wherein the impact shield comprises a higher stiffness rating than the shock absorbing sleeve.

13. The shaft assembly of claim 8, wherein the shock absorbing sleeve has a higher modulus of toughness rating than the impact shield.

* * * * *